United States Patent [19]

Patil et al.

[11] Patent Number: 5,292,813
[45] Date of Patent: Mar. 8, 1994

[54] FULLERENE-GRAFTED POLYMERS AND PROCESSES OF MAKING

[75] Inventors: Abhimanyu O. Patil, Westfield; George W. Schriver, Somerville; Robert D. Lundberg, Bridgewater, all of N.J.

[73] Assignee: Exxon Research & Engineering Co., Florham Park, N.J.

[21] Appl. No.: 955,649

[22] Filed: Oct. 2, 1992

[51] Int. Cl.$^5$ .................. C08L 23/36; C08F 210/16
[52] U.S. Cl. ........................... 525/240; 525/192; 525/285; 525/301; 525/326.1; 525/326.6; 525/328.2; 525/328.3; 525/330.7; 525/331.4; 525/331.7; 525/356; 525/380; 525/381; 525/382; 252/50; 252/51; 252/51.5 A; 523/175
[58] Field of Search ............. 525/240, 285, 326.1, 525/326.6, 328.2, 330.7, 331.4, 331.7, 356, 380, 381, 382, 328.3

[56] References Cited

U.S. PATENT DOCUMENTS

| | | | |
|---|---|---|---|
| 3,215,707 | 11/1965 | Rense | 548/506 |
| 3,231,587 | 1/1966 | Rense | 549/255 |
| 3,272,746 | 9/1966 | LeSueur | 252/475 |
| 3,275,554 | 9/1966 | Wagenaar | 252/50 |
| 3,361,673 | 1/1968 | Stuart | 252/51.5 A |
| 3,401,118 | 9/1968 | Benoit | 252/51.5 A |
| 3,438,757 | 4/1969 | Honnen | 44/335 |
| 3,442,808 | 5/1969 | Traise | 252/49.6 |
| 3,565,804 | 2/1971 | Honnen | 252/50 |
| 3,912,764 | 10/1975 | Palmer, Jr. | 549/255 |
| 3,969,330 | 7/1976 | Lasis et al. | 526/14 |
| 4,000,353 | 12/1976 | Gardiner | 536/20 |
| 4,110,349 | 8/1978 | Cohen | 549/255 |
| 4,234,435 | 11/1980 | Meinhardt | 252/51.5 A |
| 4,820,432 | 4/1989 | Lundberg | 252/51.5 A |
| 4,828,742 | 5/1989 | Lundberg | 252/51.5 R |
| 4,839,073 | 6/1989 | Gutierrez | 552/51.5 A |
| 4,987,200 | 1/1991 | Datta | 526/75 |
| 5,030,370 | 7/1991 | Patil | 252/50 |

OTHER PUBLICATIONS

Comprehensive Polymer Science vol. 6: Polymer Reactions, Pergammon Press, 1986, p. 2.

(Tetrahedron Letters, 33(15) 7 Apr. 1992–date stamped).
(Angew. Chem. Int. Ed. Engl. 30(10), 1991–date stamped).
Hirsch et al., Angew. Chem. Int. Ed. Engl. 1991, 30, pp. 1309–1310, "Globe-trotting Hydrogens on the Surface of the Fullerene Compound $C_{60}H_6(N(CH_2CH_2)_2O)_6$".
Wudl, et al., Am. Chem. Soc. Symp. 1991, pp. 161–175, "Survey of Chemical Reactivity of $C_{60}$".
Seshadri, et al., Tetrahedron Letters, 1992, pp. 2069–2070, "Addition of Amines and Halogens to Fullerenes $C_{60}$ and $C_{70}$".
Rao, et al., Indian. J. of Chem., May, 1992, vol. 31, A&B, pp. F27–F31, "Nitrogen Derivatives of $C_{60}$ and $C_{70}$".
Loy, et al., J. Am. Chem. Soc., 1992, pp. 3977–3978, "Synthesis of A $C_{60}$–Para-Xylene Copolymer".
Datta, et al., "Direct Polymerization to Functoinalized Ethylene-Propylene Copolymers," Polymer Prep., Am. Chem. Soc., Div. Polymer Chem, 33, 899–900 (1992).

*Primary Examiner*—Joseph L. Schofer
*Assistant Examiner*—Mark Nagumo
*Attorney, Agent, or Firm*—Linda M. Scuorzo

[57] ABSTRACT

This invention relates to novel compositions of matter, fullerene graft amine-containing polymers, and the process of making them. The graft is made by reacting a fullerene with a primary or secondary amine-containing polymer, preferably a hydrocarbon containing polymer in effective amounts, typically from about 10:1 to about 1:10 mole ratio of reactive amine in polymer to fullerene for a time and under conditions effective to produce the compositions. Suitable starting polymers are those containing primary or secondary amino groups, e.g., EPDM amine, PIB-amine, PIBSA-PAM, and Mannich based polymers. The preferred polymers are oil soluble, as the novel compositions of that type may be used as viscosity modifiers and lube additives. The crosslinked compositions may be used in essentially any application as the original polymer, but in which an increase in tensile strength would be desired.

17 Claims, No Drawings

FULLERENE-GRAFTED POLYMERS AND PROCESSES OF MAKING

FIELD OF THE INVENTION

The present invention relates to certain fullerene-grafted polymers and the process of making them.

SUMMARY OF THE INVENTION

The present invention relates to certain novel compositions of matter, fullerene grafted amine-containing polymers, and the process of making them. The polymers are made by grafting one or more fullerene molecules to reactive primary or secondary amino groups in pre-formed, i.e., pre-polymerized polymers, preferably hydrocarbon or other oil soluble polymers, more preferably polyolefins, suitably EPDM-amine, PIB-amine, PIBSA-PAM and Mannich polymers, to form reaction products rather than simple mixtures of the starting materials.

The process may be carried out under conditions of temperature and pressure effective to facilitate the intimate contact of the fullerenes and polymer, suitably in neat liquid polymer or in polymer and/or fullerenes in a suitable solvent. The process may be carried out at room temperature for polymers that are liquid at that temperature. The fullerene may be substituted or unsubstituted.

Amine-containing polymers used as starting materials for the compounds of the present invention can be prepared in a variety of procedures known to those skilled in the art. One approach is to incorporate the primary or secondary amine functionality during the polymerization process. A very desirable and practical route to polymerization of ethylene and alpha olefins is the well known use of Ziegler catalysts. The copolymerization of ethylene (E) and propylene (P), for example, using Ziegler type catalysts, can give rise to EP copolymers of very high molecular weight of precisely controlled structures. These copolymers have found a wide variety of applications, including lubricant additives, as viscosity modifiers for mineral oils and synthetic lubricants. Similarly the homopolymers of propylene are widely employed as fibers, for example, as films for packaging applications. These polymers in unmodified form are not suitable as starting materials. However, introduction of suitable termonomers which contain reactive primary or secondary amine groups (e.g., during the Ziegler polymerization process) forms a material containing the reactive amine functionality needed for the instant invention.

Similarly, a hydrocarbon polymer such as the EP copolymer described above can be modified by reaction with a functional group, such as maleic anhydride, to produce an ethylene-propylene polymer/succinic anhydride adduct (EPSA) by procedures well known to those skilled in the art. The subsequent reaction of EPSA with a polyamine such as diethylene triamine results in an amine containing polymer suitable for use as a starting material in this invention. This procedure is representative of a variety of techniques wherein a hydrocarbon polymer may be modified subsequent to polymerization to permit reaction with a polyamine to give the desired amine-containing polymer starting material for use in the present invention. Another widely used post polymerization series of reactions is that of PIBSA-PAM dispersants. In this case a polyisobutylene polymer of number average molecular weight of 500 to 5000 is reacted with maleic anhydride to yield a polyisobutylene succinic anhydride adduct (PIBSA). This viscous fluid can then be reacted with a variety of polyamines to yield PIBSA-PAM adducts, widely employed commercially as multifunctional lubricant additives. As demonstrated by the preceding examples, the amine-containing polymer starting materials may be prepared by a variety of well known procedures including those where the amine group is incorporated into the polymer during the polymerization process or where the polyolefin is subsequently reacted with a connecting group (such as maleic anhydride) and then the appropriate polyamine is further reacted to create the final amine-containing polymer starting material.

The fullerene grafted amine-containing polymers of the present invention will vary in the extent of bridging (crosslinking and/or chain extending) with and among chains in the polymer depending upon the nature of the polymer and the mole ratio of fullerene molecules to amino groups in the starting polymer, with an excess of amino groups tending to produce a greater amount of crosslinking than one in which the ratio is more nearly 1:1.

The process of the present invention may be used to make the novel fullerene grafted amine-containing polymers of the present invention. Generally, compositions of the present invention that are not substantially crosslinked may be utilized for preparation of solutions or flexible films prepared from these materials, suggesting these materials are processable. Amine-containing polymers are well known for their use in multifunctional lubricant additives; e.g., ashless lube and fuel dispersants, antioxidants and viscosity improvers ("VI"). Fullerenes, with their unique structures, may be used to modify the properties of polymers; e.g., fullerenes may be used to modify the lubricant properties of polymeric additives. Thus, the compositions of the present invention may be employed as viscosifiers for organic liquids or mineral oils, and may be used as lubricating oil additives. Crosslinked compounds may be used in applications in which increased tensile strength of the polymer is required and may be used in essentially any application suitable for the polymer itself, but when an increase in tensile properties would be preferred.

DETAILED DESCRIPTION OF THE INVENTION

"Polymer", as used herein, means any homo, co-, ter-, or tetra-polymer. The term "polyolefin" means polymer derived by polymerization of an olefin (e.g., ethylene propylene diene monomer polymer, polyisobutylene). The term "bridged" includes both chain extension and crosslinking.

The term "fullerene" means a class of all carbon containing molecules having an even number of carbon atoms arranged over the surface to form a closed hollow cage, typically a sphere or spheroid in the case of fullerenes such as $C_{60}$. Fullerenes are a class of all-carbon containing molecules which have an even number of carbon atoms arranged in the form of a closed hollow cage, typically a sphere or spheroid, in the case of the fullerenes. Each atom is linked to three nearest neighbors by bonds which define a polyhedral network. $C_{60}$ has the shape of a truncated icosahedron composed of 32 faces, of which 12 are pentagonal and 20 are hexagonal, a structure analogous to a soccerball. Suitably, $C_{60}$, $C_{70}$, $C_{76}$, $C_{78}$, $C_{84}$, $C_{120}$ and mixtures thereof may be used herein, although other fullerenes may also be used. Partially substituted fullerenes also may be used, where the substituent is suitably any one or more that may be incorporated under conditions compatible with the process of the present invention. As used herein, amino group substituents are preferred.

By "amine", "amino group", "amino-containing" and "aminosubstituted" is meant a primary or secondary amine or amino group that is available for bonding with or grafting to a fullerene under the conditions of the process of the present invention. The amino group(s) may be contained or isolated in one monomer of the polymer (e.g., ethylene propylene amine functionalized terpolymer) or may be present in a plurality of locations in the polymer (e.g., PIB-amine).

The terms "graft" and "bond", when applied to the attachment of the fullerene to the starting polymer, means the reaction of a fullerene with an pre-existing or pre-synthesized polymer containing a reactive primary or secondary amino group. Concurrent incorporation of fullerenes into polymer chains during synthesis of the polymer is not included in the present invention.

The compositions of the present invention include the products produced by the processes disclosed herein.

Fullerenes are produced by high temperature reactions of elemental carbon or of carbon-containing species by processes known to those skilled in the art; for example, by laser vaporization of carbon, heating carbon in an electric arc and burning hydrocarbons in sooting flames. In each case, a carbonaceous deposit or soot is produced. From this soot, various fullerenes can be obtained by extraction with appropriate solvents, such as toluene. The primary constituent of a toluene extracted of the soot usually is $C_{60}$, sometimes called Buckminsterfullerene. Lesser amounts of another fullerene, $C_{70}$, are formed along with traces of higher fullerenes, e.g., $C_{84}$, $C_{120}$. The exact composition of the extract varies with its method of preparation, but a typical composition is 80% $C_{60}$, 19% $C_{70}$ and 1% of many different higher fullerenes. The fullerenes can be separated by known methods, in particular by high performance liquid chromatography (HPLC); for example, as described in Kratschmer, Nature 1990, 347, 354–358, or from commercial sources. The polymer starting materials may be synthesized by art recognized procedures which are summarized herein. Other materials are available commercially.

Attachment of a fullerene moiety to reactive amino group sites of an amine-containing polymer to form the fullerene-grafted amine-containing polymers of the present invention can be used advantageously to affect the properties of the starting polymer in several ways. First, it adds mass and bulk to the polymer. It also converts one or more reactive amino groups in the polymer to less reactive forms by removing a hydrogen atom from the amine nitrogen. It also increases the steric bulk around the amine nitrogen, rendering it less aggressive in attacking other species.

The compositions of the present invention include fullerene grafted amine-containing polymers wherein the fullerene has been made to undergo further reactions at the fullerene functionality characteristic of fullerenes ("substituted fullerenes"), provided that the conditions required for those reactions are not incompatible with the presence of amines. In particular, the fullerene-grafted amine-containing polymers of the present invention can undergo reaction with additional ammonia or amine molecules (i.e. polymeric amines-/aminecontaining polymers or small-molecule amines). Reaction with polymeric amines/amine-containing polymers may be carried out to join together two or more polymers at the reactive amino group, increasing the molecular weight in the resulting composition ("chain extended" polymer), and/or can also lead to multiple connections between polymer chains at reactive amino groups to produce a composition having decreased solubility and increased crosslinking among polymer chains ("crosslinked" polymer). The fullerene can also function as a bridging group to allow connection of molecules to a polymer which would not be connected in the absence of the fullerene. For example, small molecule amines such as alkylamines (e.g., n-propylamine) do not react with an amine-containing hydrocarbon polymer, but can add to a fullerene-grafted amine-containing hydrocarbon polymer at the fullerene.

Additionally, the amine to be added to the fullerene-containing polymer can contain other functional groups, provided they are compatible with the process conditions of the present invention. For example, N,N-dimethyl-1,3-diaminopropane reacts with fullerene containing polymer products to give species where a tertiary amine has been attached to the polymer at the fullerene. A tertiary amine would react neither with the amine-containing polymer nor with a fullerene under similar conditions.

Polymer molecules with more than one amine capable of reacting with fullerenes per polymer chain can react with more than one fullerene-containing polymer, resulting in chain extended or crosslinked fullerene-grafted amine-containing polymers, as determined by the particular reaction conditions.

In all cases, the starting polymer must contain or be modified before addition of the fullerenes to contain at least one reactive amine (i.e., primary or secondary amino) group in order to provide a site for grafting the fullerene to produce the polymers of the present invention. Preferred starting polymers, particularly when the compositions are to be used as lube additives or in other formulations requiring compatibility with another hydrocarbon, are naturally occurring or synthetic hydrocarbon-containing polymers, more preferably hydrocarbon or other oil soluble polymers, typically containing about at least 50 wt. % hydrocarbon content, most preferably hydrocarbon or other oil soluble olefinic polymers. For ethylene propylene polymers, preferred polymers are ethylene propylene norbornene terpolymers, ethylene propylene, ethylene butene-1, ethylene pentene-1, polyisobutylene, as they can be modified to contain the necessary reactive amino functionality, succinic anhydride polyamine ("PIBSA-PAM") and polyisobutylene amine ("PIB- .nine").

Typically, introduction of the amine functionality to a polymer to make it suitable for grafting with a fullerene may be accomplished by several ways. For example, an amino-substituted polymer, such as amino-substituted ethylene propylene norbornene terpolymer can be prepared by copolymerizing ethylene (and, optionally, an alpha-olefin) with a masked nitrogen-containing monomer wherein the primary or secondary nitrogen group of the nitrogen-containing monomer is masked with an organometallic compound (preferably, a non-halogenated organometallic compound), followed by deashing the resulting polymer product mixture to remove the organometallic compound and thereby form the amino-substituted polymer. The nitrogencontaining monomer is suitably an unsaturated compound which is copolymerizable with olefins such as ethylene and propylene using a Ziegler catalyst. The nitrogen-containing monomer is masked prior to introducing into the polymerization; otherwise, an unmasked functionality would tend to react almost immediately with the Ziegler-Natta polymerization catalyst, thereby leading to a loss of activity. The masking reaction provides a chemical deactivation of the reactivity of the functional monomer. For procedures known to the art for forming ethylene propylene diene monomer amine, see, e,g., Datta, S.; Verstrate, G.; Kresge, E. N., Polym. Prepr., Am. Chem. Soc., Div. Polym. Chem., 1992, 33, 899-900; Datta, S.; Kresge, E. N., U.S. Pat. No. 4,987,200 (Exxon) for synthesis of EPDM-amine; Patil, A. O.; Datta, S.; Gardiner, J. B.; Lundberg, R. D., U.S. Pat. No. 5,030,370 (Exxon). Other amino substituted polymers can be prepared by halogenation of a polyolefin, e.g., chloro-PIB, followed by amination of the halogenated polyolefin by art recognized processes.

If the composition is to be used as a hydrocarbon viscosity modifier, the number of amino groups added to form the starting material must be controlled to maintain oil solubility. This may be readily accomplished by one skilled in the art with respect to the starting material based on art recognized procedures, and with respect to the ratios of amino groups to fullerenes, based on the teachings herein.

The polymers suitable as starting materials in the present invention may be linear, block or random polymers provided that they otherwise have the required primary or secondary amino group(s) present and otherwise have the characteristics described herein. The starting polymer suitably will have a number average molecular weight (Mn) of equal to or greater than about 500. High Mn polymers may be used, however, constraints imposed by conventional polymer technology make handling difficult. More suitably, Mn is from about 500 to about 500,000, most suitably from about 5,000 to about 200,000 and a molecular weight distribution of from about 1.0 to 20, preferably 1.5 to 15. Small amines (also referred to herein as "small molecule amines" are not included in the definition of starting polymer. The term "small amines" means amines having a molecular weight (Mn) of less than or equal to 300 and/or equal to or less than 12 carbon atoms. Where the starting polymer is an ethylene propylene (EP) polymer, it will typically contain from about 20 wt. % to about 90 wt. % ethylene and the balance by total weight of from about 10 wt. % to about 80 wt. % propylene (or other olefins) and the termonomer containing the amino functionality. When other polyolefins such as PIB-amine or PIBSA/PAM amine is used, molecular weight of the hydrocarbon polymer is typically from Mn 500 to 5000.

The embodiments of the present invention may suitably comprise, consist or consist essentially of the elements disclosed; and any process may suitably be practiced, in the absence of any step(s) not specifically disclosed as required.

Amine-containing ethylene propylene polymers, such as EPDM-amine, can be prepared by the direct incorporation of masked, nitrogen-containing monomers (MNCM) into homopolymers and copolymers, such as polyolefins and particularly ethylene-propylene copolymers (EPM), to form copolymers, terpolymers and tetrapolymers containing the MNCM, as summarized herein. The nitrogen-containing monomer (NCM) is an unsaturated compound which is copolymerizable with polymer chain monomers (PCM), viz. olefins such as ethylene and propylene using a Ziegler catalyst. The term nitrogen-containing monomer (NCM) means the unsaturated, nitrogen-containing monomers which contain at least one primary amino and/or secondary amino group. Exemplary of nitrogen-containing monomers are norbornenyl-methyl amines and imines and preferably 5-norbornenyl-2-methylamine, 5-norbornene-2,3-dimethylamine, 5-norbornene-2-ethylamine.

The term masked, nitrogen-containing monomer (MNCM) refers to the reaction products formed by the reaction of the nitrogen-containing monomer and a metallic organic compound masking agent. The masked, nitrogen-containing monomer so formed is used as the actual comonomer in the polymerization process. The NCM is preferably masked in a reaction with non-halogenated metallic compounds such as organoaluminum compounds under controlled conditions and then contacted with suitable monomers for production of the amine-containing polymer starting material for the novel method and compositions of the present invention.

The conventional monomers normally used in the production of these polymers, preferably ethylene and $C_3$-$C_{25}$ alpha-olefins, and mixed olefins may optionally contain a third type of monomer which is an easily polymerizable non-conjugated diene, suitably straight chain, hydrocarbon di-olefins or cycloalkenylsubstituted alkenes, having about 6 to about 15 carbon atoms.

The polymerization process is performed in an otherwise conventional manner using suitable methods and catalysts known to be effective for such polymerization and can be carried out at any temperature and pressure suitable for Ziegler catalysis. The polymerization can be carried out in the presence of a molecular weight regulator such as hydrogen to produce an amino-substituted polymer having any particular desired molecular weight. The polymerization is quenched at the exit of the reactor by the introduction of suitable amounts of water, lower alkanol, or aqueous acid (e.g. aqueous HCl) as quench liquid. The desired amino functional group incorporated into the amino-substituted polymer as the masked functional group, can be regenerated by removal of the masking metal, through use of conventional de-ashing techniques, wherein the quneched polymerization products, containing masked-functionalized polymer, the polymerization catalysts, and unreacted monomers, are contacted with an aqueous liquid, e.g., water, aqueous solutions containing suitable mineral acids. The resulting hydrolysis reactions ("deashing") liberate the metal masking agent and generate the amino functional grov ,ɔ, thereby forming the polymer. Thus, one embodiment of the present invention is a polymeric composition which comprises the reaction product of a fullerene and an amine-containing polymer having at least one reactive group selected from the group consisting of primary amines, secondary amines and mixtures thereof, said polymer formed by the process of copolymerizing ethylene with an alpha-olefin and an organometallic compound-masked nitrogen-containing monomer, followed by deashing to remove the organometallic compound. Further information on the formation of these polymers is found in U.S. Pat. No. 4,987,200, the disclosure of which is incoprorated herein by reference.

Additional amine-containing polymers suitable for use as starting materials herein, PIBSA-PAM, PIB-amine, and Mannich polymers, are adducts made as described in detail in U.S. Pat. No. 4,839,073, which disclosure is incorporated herein by reference, which is summarized as follows. Generally, the process involves contacting an amine compound having at least two reactive nitrogen moieties (amino groups) with at least one long chain hydrocarbon-substituted reactant in an amount and under conditions sufficient to form an amine-containing polymer adduct. The long chain hydrocarbon-substituted reactant will be at least one of: (i) long chain hydrocarbons substituted with monoor dicarboxylic acid, anhydride or ester groups; (ii) halogenated long chain hydrocarbons; (iii) mixtures of formaldehyde and a long chain hydrocarbyl substituted phenol; and (iv) mixtures of formaldehyde and a reaction product formed by reaction of long chain hydrocarbons substituted with mono or dicarboxylic acid, anhydride or ester groups and an amino-substituted, optionally hydrocarbyl-substituted phenol.

The amine compounds will generally be at least one of ammonia, organic primary monoamines and organic polyamines containing at least one primary amine group or at least two secondary amine groups per molecule and may be hydrocarbyl amines or may be hydrocarbyl amines including other groups, e.g. ethylene diamine, propylene diamine, and diethylene triamine.

The long chain hydrocarbyl polymer-substituted reactant includes the reaction product of an effective amount as known in the art of a long chain hydrocarbon polymer, generally a polyolefin, with a monounsaturated carboxylic reactant comprising at least one member selected from the group consisting of (i) monounsaturated $C_4$ to $C_{10}$ dicarboxylic acid; (ii) derivatives of (i) such anhydrides or $C_1$ to $C_5$ alcohol derived mono- or di-esters of (i); (iii) monounsaturated $C_3$ to $C_{10}$ monocarboxylic acid wherein the carbon-carbon double bond is conjugated to the carboxy group; and (iv) derivatives of (iii) such as $C_1$ to $C_5$ alcohol derived monoesters of (iii). Upon reaction with the polymer, the monounsaturated carboxylic reactant becomes saturated. Thus, for example, maleic anhydride becomes a polymer substituted succinic anhydride, and acrylic acid becomes a polymer substituted propionic acid. Examples of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing. Thus, an embodiment of the invention is a polymeric composition comprising the reaction product of a fullerene and the reaction product of a long chain hydrocarbyl substituted mono- or dicarboxylic acid or its anhydride, said long chain hydrocarbyl having a number average molecular weight of from about 500 to about 10,000 and a polymer containing at least two reactive amino groups selected from the group consisting of primary amino groups, secondary amino groups, and mixtures thereof wherein the reaction product contains at least one reactive amino group selected form the group consisting of primary and secondary amino groups.

The polyolefin for reaction with the monounsaturated carboxylic reactants are suitably homo- and copolymers comprising a major molar amount of $C_2$ to $C_{10}$, e.g., $C_2$ to $C_5$ monoolefin, including ethylene and propylene or ethylene and butene-1. The polymer can be reacted with the monounsaturated carboxylic reactant by a variety of art recognized methods, for example, by first halogenated the polymer to about 1 to 8 wt. % chlorine or bromine, based on the weight of polymer, then reacting the halogenated polymer with sufficient monounsaturated carboxylic reactant or by concurrently heating the polymer and monounsaturated carboxylic reactant while adding halogen for a time and at a temperature so the product obtained will contain the desired number of moles of the monounsaturated carboxylic reactant per mole of the halogenated polymer. Processes of these types are taught, for example, in U.S. Pat. Nos. 3,087,436 and 3,215,707, respectively.

Alternatively, the polymer and the monounsaturated carboxylic reactant can be contacted at elevated temperature to cause a thermal "ene" reaction to take place. In this process, the selected polymer and monounsaturated carboxylic reactant and halogen are contacted for a time and under conditions and amounts of reactants effective to form the desired polymer substituted mono- or dicarboxylic acid material. Thermal "ene" reactions have been described in U.S. Pat. Nos. 3,361,673 and 3,401,118, the disclosures of which are hereby incorporated by reference in their entirety. Optionally, a catalyst or promoter including alkoxides of Ti, Zr, V and Al, and nickel salts may be used as is commonly done in the art.

The amine compound(s) are reacted with the polymer substituted mono- or dicarboxylic acid material by heating optionally in an oil solution containing 5 to 95 wt. % of the polymer substituted dicarboxylic acid until the desired amount of water is removed, in a manner that favors formation of imides and/or amides, rather than salts.

Long chain hydrocarbyl reactants are halogenated long chain aliphatic hydrocarbons (as shown, e.g., in U.S. Pat. No. 3,275,554, the disclosure of which is hereby incorporated by reference) where the halogen group on the halogenated hydrocarbon is displaced with the nitrogen-containing compound in the subsequent reaction therewith. The amount of halogen introduced, as well as reaction conditions, may readily be determined by one skilled in the art, depending on the particular hydrocarbon used, the desired amount of amine to be introduced into the molecule, the particular alkylene amine used, and the halogen used.

Another class of long chain hydrocarbyl reactants suitable as starting polymers in the present invention are any of the long chain hydrocarbyl-substituted hydroxy aromatic compounds which are known in the art as useful for forming Mannich condensation products. Mannich condensation products generally are prepared by condensing about 1 mole of a high molecular weight hydrocarbyl substituted hydroxy aromatic compound (e.g., having a number average molecular weight of 700 or greater) with about 1 o 2.5 moles of an aldehyde such as formaldehyde or paraformaldehyde and about 0.5 to 2 moles of the second adduct, using the condensation conditions as disclosed, e.g., in U.S. Pat. Nos. 3,442,808; 3,649,229; and 3,798,165 (the disclosures which are hereby incorporated by reference in their entirety). Such Mannich condensation products may include a long chain, high molecular weight hydrocarbon on the phenol group or may be reacted with a compound containing such a hydrocarbon, e.g., polyalkenyl succinic anhydride as shown in said aforementioned U.S. Pat. No. 3,442,808.

Still another class of long chain hydrocarbyl reactants are the Mannich base aminophenol-type condensation products as they are known in the art. Such Mannich condensation products generally are prepared by reacting about 1 mole of long chain hydrocarbon substituted mono and dicarboxylic acids or their anhydrides (e.g., polyisobutylene-substituted succinic anhydride) with about 1 mole of aminesubstituted hydroxyaromatic compound (e.g., aminophenol), which aromatic compound can also be halogen- or hydrocarbyl-substituted, to from a long chain hydrocarbon substituted amide or imide-containing phenol intermediate adduct (generally having a number average molecular weight of 700 or greater), and condensing about a molar proportion of the long chain hydrocarbon substituted amide- or imide-containing phenol intermediate adduct with about 1 to 2.5 moles of formaldehyde and about 0.5 to 2 moles of the second adduct of this invention.

The preparation and use of the hydroxyaromatic compounds and amino-substituted hydroxyaromatic compounds, and methods useful for reaction thereof with an aldehyde and the selected amine compound are known in the art described in U.S. Pat. Nos. 4,820,432 and 4,828,742, the disclosures of which are hereby incorporated herein in their entirety.

The adducts formed by reaction of amines and long chain hydrocarbyl reactants to form the N-containing adducts described above and used as starting materials in the present invention will preferably have within their structure, on average, at least about 0.5 (e.g., from about 0.5 to 20) reactive amine groups per molecule.

In the process of the present invention, the reaction between amino substituted polymer and fullerene produces fullerene grafted amine-containing polymers of the present invention. While not wishing to be bound by any particular theory or mechanism, the following features of the reaction are proposed.

If the aminated polymer starting material has only 1 reactive amino group per molecule, then the reaction between fullerene and this polymer may be carried out to form an adduct which is not crosslinked; i.e., the product will normally be soluble in a suitable solvent, preferably a hydrocarbon or oil solvent. However, if the fullerene grafted amine-containing polymer has multiple reactive amino groups per polymer molecule then the reaction with fullerene has the potential to produce a crosslinked (i.e., insoluble) product if the reaction conversion is sufficiently high. One skilled in the art can establish the appropriate parameters to produce a product which is substantially soluble or one which is highly crosslinked, given the teachings herein, by selecting the appropriate ratio of amino groups to fullerenes and by analyzing the resulting compositions by known techniques for measuring solubility. As an example, a sample of EPDM-amine which contains on the average of only one amine per polymer molecule will react with fullerene to yield a composition that is substantially soluble in common solvents known to those skilled in the art even at high reaction conversions because the capability of each polymer molecule to react with all other molecules through the fullerene is low.

If however, there are multiple reactive amine groups per polymer molecule, the probability of Fullerene reacting with more than one polymer molecule increases. As the extent of reaction is increased to convert more of the unreacted amines to fullerene adducts, the solubility of the product will be reduced since a network will be formed. Thus a crosslinked polymer composition will result at high conversion. If the polymer number average molecular weight is high (at least about 100,000) and many reactive amine groups per polymer molecule (e.g., at least about 10) are present, crosslinking will be facile.

If the polymer number average molecular weight is low (below about 5000) the probability of crosslinking is markedly reduced even with multiple reactive amines per polymer chain. In situations where the polymer is not substituted to the same degree with amino groups, the reaction with fullerene can give rise to a product which is partially soluble in the chosen solvent. The fraction of composition which is soluble is referred to as per cent soluble, and is measured in suitable solvents as known to those skilled in the art for the polymer. In the case of EPDM-amine a suitable solvent is xylene.

While the preceding discussion is directed to high molecular weight polymers which possess varying levels of reactive amino groups randomly distributed along the polymer chain (as with EPDM-amine), the situation is different with polymeric systems such as PIB-amine or PIBSA-PAM dispersants, which are typically synthesized to produce a localized concentration of amino groups connected to a moderately high molecular weight polyisobutylene. Under these conditions, there can be multiple reactions of the amino functionality with a single fullerene molecule, but lowered probability of polymer-polymer reactions. These compositions typically have a higher level of solubility and most often are completely soluble.

The soluble compositions can be further characterized in solution by measuring the viscosity contribution to standard solution. This measurement is a direct measure of the hydrodynamic volume of the novel fullerene grafted amine-containing polymer. A convenient and widely employed viscometric technique involves dissolution of the soluble adduct in a suitable solvent at about 1 gram per deciliter, followed by measurement of the viscosity of the polymer solution. The Reduced Viscosity (Red. Vis.) is then defined as:

$$\text{Red. Vis.} = \frac{\eta_{soln} - \eta_o}{\eta_o C}$$

where
$\eta_{soln}$ is viscosity of the solution;
$\eta_o$ is viscosity of the solvent;
C is polymer concentration in grams/deciliter.

When these measurements are conducted at different polymer concentrations, the extrapolated value of Reduced Viscosity at zero concentration is a directly and commonly used measure of the hydrodynamic volume of the polymer, the Intrinsic Viscosity.

Fullerene grafted amine-containing polymer adducts typically possess a higher value of the Reduced Viscosity and the Intrinsic Viscosity than the starting polymer. Such results are shown in Table 1.

TABLE 1

Reduced Viscosity Vs. Concentration in Xylene for EPDM-NH$_2$ and C$_{60}$-Grafted EPDM amine

| Polymer | Conc. g/100 cc | Reduced Viscosity |
|---|---|---|
| EPDM amine | 0.122 | 0.913 |
| | 0.244 | 0.961 |
| | 0.49 | 1.07 |
| | 0.974 | 1.30 |
| EPDM amine/ | 0.116 | 1.19 |
| C$_{60}$ | 0.232 | 1.28 |
| | 0.46 | 1.46 |
| | 0.926 | 1.84 |

When the polymeric amine has a higher level of reactive amino groups (greater than 2 per chain), reaction with fullerene will lead to a crosslinked product. These crosslinked materials have utility since this reaction and its product offers a new route to crosslinking these materials, either in solution, or in the bulk state. For example, thin films of EPDM-amine can be readily crosslinked in the presence of fullerene, leading to an adduct which is solvent and temperature resistant and possesses improved tensile strength.

Optionally, the pendant substituted fullerene grafted amine-containing polymer may be reacted with small primary-tertiary diamines, for example, N,N-dimethylaminopropylamine or N-aminopropylmorpholine, to obtain novel multiarm amine-functionalized polymers. In these types of reactions, the primary amine portion will react, but not the tertiary amine. Since there is more than one reactive site for such amines on the fullerene, this invention includes the addition of several of such compounds to the fullerene grafted amine-containing polymers.

The present invention also relates to a method of making a fullerene-containing graft polymer by graft reaction of a fullerene onto an amino group in the polymer. More particularly, said process comprises: combining an effective amount of a polymer containing a primary or secondary amino group or mixtures thereof and a fullerene; and reacting the polymer and fullerene for a time and under conditions sufficient to form a fullerene-grafted polymer. The mixture should be such that the polymer is in suitable form to facilitate molecular mixing or contact; e.g., by dissolution in a suitable solvent or neat where polymer is liquid, or by applying heat or other external means for fluidizing where the polymer is solid or semi-solid. A fullerene grafted amine-containing polymer composition is thus formed by graft reaction such that the fullerene bonded onto the nitrogen of the primary or secondary amino group of the starting polymer thus:

wherein at least one of R and R' is a polymer unit preferably, for applications requiring compatibility with a hydrocarbon, a hydrocarbon soluble polymer unit, of the polymer R—N—R', and wherein when R or R' is not a polymer unit it is selected from the group consisting of H and alkyls, which alkyls may be functionalized so long as functionality does not inhibit formation of the novel compositions under conditions herein and produces products having characteristics of this invention, wherein F is a fullerene or substituted fullerene, N is a reactive amino group of the polymer. Where oil solubility is required herein it is sufficient that the unit or group be either oil soluble or capable of being rendered oil soluble under the conditions disclosed herein. Where the polymer unit contains more than one amino group, fullerene grafts either by crosslinking or chain extension are also included in the scope of the above formula.

Optionally, the process further comprises reacting the fullerene-grafted amine-containing polymer with an effective amount of a second amine wherein the second amine may be a small amine or a polymeric amine/amine-containing polymer for a time and under conditions sufficient to produce at least one substituted amino group on the fullerene.

It is equally appropriate under the process of the present invention to react the fullerene first with a small amine to partially functionalize (aminate) using procedures known in the art to functionalize the fullerene with a small amine and then react the partially functionalized fullerene with a (primary or secondary) amine containing polymer of the types described herein.

In order to graft fullerenes onto the starting polymer, both must be present in a form or medium that will produce sufficient contact and molecular mixing sufficient to carry out the reaction. This may be accomplished by dissolving the fullerenes in a suitable solvent, e.g., methylene chloride, chloroform or preferably toluene or benzene for $C_{60}$ and $C_{70}$, or by adding the fullerenes neat, provided that the starting polymer is in a suitable form, condition, phase or medium to allow contact without altering its essential properties, e.g., by dissolving the polymer in a suitable solvent, heating to fluidity, or extruding. It is within the skill of one ordinarily skilled in the art to select the appropriate means and/or media for facilitating the contact and reaction between the fullerenes and polymer. Suitable solvents for the fullerenes are toluene, xylene, benzene, chloroform. Other suitable solvents for dissolving polymer and carrying out the reaction, e.g., heptane, THF, mineral oil, may be used, although the fullerenes do not dissolve therein. For commercial purposes, use of the process in the absence of solvent is desirable.

The reaction should be carried out at a temperature sufficient to facilitate the grafting reaction, e.g., with suitable mixing or stirring. Suitably, 0° C. to the lower of the refluxing temperature of the solvent or the temperature at which the amino groups of the polymer decompose should be used; however, more mild temperature conditions may be used, typically from about 20° C. to about 100° C., provided in all cases that the polymer can be maintained in a suitably liquid fluid form within the range. Suitably, the reaction may be carried out at pressures from about 0 kpa to about 3000 kpa. More severe conditions may be used to accelerate the reaction. The reaction time is generally from about 15 min. to about 1 week.

The process may be used to produce graft polymers with varying degrees of grafting of the fullerenes to the polymer backbone. Generally, a mole ratio of amino group in the polymer to fullerene molecules of from about 1:10 or greater than 10 produces grafting; 10:1 or greater than 10:1 gives crosslinking or chain extension. Intermediate ratios, such as 1:1, give results that depend on the nature of the particular polymer employed.

Grafting of the fullerene functionality is evidenced by physical changes (such as change in color) in the polymer and/or fullerene sol .ion, formation of a soluble material, particularly if one of the starting materials was insoluble, change in viscosity (or intrinsic viscosity) or change in spectrometric properties of the fullerene grafted amine-containing polymer as compared to that of the original polymer. The nature and extent of the change(s) depends in part on the ratio of the starting reagents employed. Thus, for example, EPDM-amine is a colorless polymer, soluble in THF or heptane and $C_{60}$ is a purple solid, insoluble in heptane. When reacted in a mole ratio of about 5:1, a reddish brown product, soluble in THF or heptane, formed. In these cases, nearly complete reaction of the fullerene and polymer is evident from the infrared spectrum of the product. The characteristic IR bands of $C_{60}$ at 527 and 578 cm$^{-1}$ disappear in the reaction product. Likewise, a broader peak at 615 cm$^{-1}$ due to the unfunctionalized polymer disappears upon reaction. If other polymers or fullerene are used, suitable detection that takes into account their properties may suitably be selected by those skilled in the art.

Additional physical measurements evidencing the reaction between the fullerenes and polymer can be provided by viscometric studies using known techniques. For example, for an EPDM-amine C$_{60}$ graft polymer the reduced viscosity-concentration profiles of the starting EPDM-amine polymer are compared with that for the fullerene grafted amine-containing polymer reaction product as measured in xylene at 30° C. The Fullerene grafted polymer contained about 4% of insoluble product in xylene, presumably due to crosslinking. Reduced viscosity provides a measure of the hydrodynamic volume (and, generally Mn) of the polymers, which increased in the value for the fullerene grafted polymer reaction product as compared to the starting EPDM-amine (i.e., the intercepts of the lines correlating reduced viscosity with concentration or intrinsic viscosities are substantially different), thus showing that the functionalized polymer is not a simple mixture or complex of C$_{60}$ and EPDM-amine. The increase in reduced viscosity (or intrinsic viscosity) is a consequence of more than one EPDM-amine reacting with some of the fullerene molecules.

The fullerene grafted amine-containing polymer can be reacted with another amine-containing polymer to link polymers together. For example, EPDM-amine reacted with C$_{60}$ may be reacted with another EPDM-amine polymer. Alternatively, EPDM amine reacted with C$_{60}$ may be reacted with PIBSA-PAM or PIB-amine under the conditions described above.

Grafting of the fullerene functionality is also desirable because C$_{60}$ may be used to provide sites for further functionalization, including functionalization by methods which would fail for the original polymer. A special case of this is crosslinking or chain extension of the original polymer by reaction of more than one polymer chain with a given fullerene molecule.

The fullerene grafted amine-containing polymer may be isolated by means known to one skilled in the art, e.g., using known or measurable solubility properties. Thus, fullerenes are insoluble in many solvents, such as heptane, in which the starting polymer materials, particularly hydrocarbon polymers and their fullerenegrafted derivatives are soluble. Dissolution of the reaction product in such a solvent and filtration may be employed to leave behind unreacted fullerene as an insoluble residue. The fullerene-functionalized polymer may then be recovered by evaporation of the solvent or precipitation, accomplished by addition of a solvent in which the product is insoluble, commonly acetone. This process will also remove small amounts of insoluble crosslinked material. Further, when the reaction is controlled to produce insoluble, crosslinked material as the desired product, that product can be isolated from the reaction by successive washing with a solvent such as heptane to remove unreacted polymer and a solvent such as toluene to remove unreacted fullerene. Depending upon the solubility of the specific polymer employed, a single solvent may accomplish both tasks simultaneously.

GENERAL CONDITIONS FOR EXAMPLES

A wide variety of amine containing polymers can be employed as starting materials in the process and to produce the compositions of the present invention. Some examples of those polymers, which are not intended to limit the scope of the invention, are as follows: (1) PIBSA-PAM dispersants; also known as alkenyl succinimide dispersants; (2) PIB-amine composition, also known as halogenated long chain aliphatic hydrocarbons where the halogen group is displaced with a nitrogen containing compound in a suitable reaction; (3) Mannich condensation products or Mannich base dispersants wherein a high molecular weight hydrocarbyl substituted hydroxy aromatic compound is reacted with formaldehyde and an amine, (4) ethylene propylene diene monomer (EPDM) polymers containing primary or secondary amine groups pendant to the polymer chain.

Examples 1-3 are prepared by the reaction of a polymeric species with a suitable amine to create the amine-containing polymer. In Example 4, the amine is incorporated into a high molecular weight polymer during the polymerization process. This wide variety of amine containing polymers indicates the spectrum of amine containing polymers which can be employed in the instant invention.

EPDM-amine samples in Examples 1-3 had an Mn=20,000 and contained 39% ethylene by weight. Elemental analysis gave 0.05% N. Infrared ("IR") spectroscopic analysis in all examples was performed using a Mattson Fourier Transform IR.

EXAMPLE 1

25 ml 3.7% heptane solution of EPDM-amine was placed in a round bottom flask. This was diluted with 10 ml heptane. To above solution was added 28 mg of C$_{60}$ (1.12 molar equivalent). The purple mixture was stirred at room temperature for 4 days and then refluxed for 8 hours. At the end of that time the color of the solution was brown. The solution was filtered, and the heptane was evaporated to give an orange solid. Analysis was performed by IR. The characteristic IR bands of C$_{60}$ at 527 and 578 cm$^{-1}$ disappear in the reaction product, demonstrating that C$_{60}$ has reacted.

EXAMPLE 2

In a round bottom flask 5 g EPDM-amine was dissolved in 50 ml toluene. To the solution was added 304 mg of a fullerene mixture extracted from carbon soot, consisting of C$_{60}$ and C$_{70}$ in the ratio of approximately 85 to 15 with less than about 1% higher fullerenes. The red solution was heated at 80° C. for 6 hours. The product was precipitated with acetone, washed with acetone and dried. The characteristic IR bands of C$_{60}$ at 527 and 578 cm$^{-1}$ disappear in the reaction product, suggesting that C$_{60}$ has reacted. The `ullerene-grafted amine-containing polymer was analyzed by thermal gravimetric analysis under air (Perkin Elmer II model) to determine the polymer's thermooxidative stability. A TGA analysis of the amino-substituted polymer was also made as a comparison. The data indicate that the 352° C. onset decomposition temperature (in air) of the amino-substituted polymer was increased to 432° C. for the product. These data indicate the fullerene-grafted amine-containing polymer is more stable than the amino-containing polymer precursor by about 40° C. at a weight loss of 50 wt. %.

EXAMPLE 3

In a round bottom flask 10 g EPDM-amine was dissolved in 100 ml toluene. To the solution was added 50 mg of $C_{60}$ (0.185 equivalent). As the $C_{60}$ dissolved, the solution became purple. The mixture was allowed to stir at room temperature for 10 days. At the end, the color of the solution was brown. The product was precipitated with acetone, washed with acetone and dried. The characteristic IR bands of $C_{60}$ at 527 and 578 cm$^{-1}$ disappear in the reaction product, showing that $C_{60}$ has reacted.

EXAMPLE 4

In a round bottom flask 3.2 g EPDM-amine/$C_{60}$-$C_{70}$ product as described in Example 2 was dissolved in 20 ml heptane. To the solution was added 4.271 g of N,N-dimethyl-1,3-propanediamine. The clear orange solution was refluxed for 8 hours and solvent was removed. The product was precipitated with acetone, washed with acetone and dried. The product was analyzed for 0.47 wt. % nitrogen as compared to 0.05 wt. % for starting EPDM-amine, indicating that the % nitrogen has increased substantially, and also suggesting that there are four molecules of diamine attached per fullerene reacted polymer.

EXAMPLE 5

PIBSA/PAM dispersant was prepared as follows:

1.80 mole of polyisobutylene succinic anhydride (saponification number 48, 86 wt. % active ingredient) is prepared from 2225 Mn PIB via a simultaneous process with chlorine gas and maleic anhydride was charged into a reaction vessel with 2897 g. of mineral oil solvent 150N and heated to 150° C. under a nitrogen blanket. Thereafter, one mole of polyalkylene polyamine (PAM containing an average of 12 carbon atoms and 6 nitrogen atoms per molecule), is added to the reaction solution while nitrogen sparging for a period of one hour. After the addition is completed, the reaction mixture is nitrogen stripped at 150° C. for two hours and filtered. The product, a 52 wt. % oil solution of polyisobutylene succinimide, analyzes for 0.88 wt. % nitrogen (of which 47 wt. % is secondary amino groups).

EXAMPLE 6

Fullerene grafted PIBSA/PAM dispersant was prepared as follows:

In a round bottom flask 1 g. PIBSA/PAM (0.88 wt. % N) prepared as in Example 5 was dissolved in 10 ml heptane. To this solution was added 55 mg of a fullerene mixture extracted from carbon soot, consisting of $C_{60}$ and $C_{70}$ in the ratio of approximately 85 to 15 with less than about 1% higher fullerenes. The solution was stirred for 72 hours at room temperature and then refluxed for 8 hours. At the end, the solution was filtered and filtrate was evaporated to get thick red solution. The characteristic IR bands of $C_{60}$ at 527 and 578 cm$^{-1}$ disappear in the reaction product, demonstrating that $C_{60}$ has reacted.

EXAMPLE 7

Fullerene-grafted PIBSA/PAM dispersant prepared as in Example 5 with N,N-dimethylaminopropylamine was prepared as follows:

In a round bottom flask 1 g. PIBSA/PAM/$C_{60}$-$C_{70}$ product described in Example 6 was mixed with 7 ml of N,N-dimethyl-1,3-propanediamine. The solution was stirred for 2 days at room temperature. At the end, the excess amine was evaporated and product was washed with acetone and dried. The product was analyzed for 3.10 wt. % nitrogen as compared with the starting value of % nitrogen of 0.88, suggesting that more than one diamine was attached to the fullerene reacted polymer.

EXAMPLE 8

ChloroPIB was prepared as follows::

Into a reaction flask was introduced 950 g. of polyisobutylene (approximate number average molecular weight=950) dissolved in 1,000 ml. of carbon tetrachloride. The mixture is stirred and chlorine is introduced at a rate of 235-250 ml. per minute, the temperature being maintained at 0° C. After the reaction mixture has taken up 51 g. of chlorine, the introduction of chlorine is terminated, the carbon tetrachloride is removed in vacuo and the chlorinated polyisobutenyl isolated and elemental analyzed showed 7.0 wt. %.

EXAMPLE 9

PIB-amine was prepared as follows:

Into a reaction flask is charged 1,156 g. of chloroisobutylene prepared as in Example 8 of approximately 950 number average molecular weight chlorinated to 7.8 wt. % chlorine, 75 ml. of xylene and 330 ml. of ethylene diamine, followed by the addition of 330 ml. of butanol. The mixture is then raised to a temperature of 100° C. over one hour and the temperature is then raised to about 160° C. and maintained there for about 4½ hours. About 330 ml. of distillate is obtained while raising the temperature from 130° C. to 160° C. The reaction mixture is transferred to a separatory funnel with the aid of one liter of benzene and the mixture is washed repeatedly first with a dilute aqueous solution of isopropyl alcohol, then with a dilute aqueous solution of a combination of isopropyl alcohol and butanol and finally with water. The volatile materials are then removed from a sample of the washed product by sparging with nitrogen to constant weight on a steam plate. Analysis gave a titrimetric equivalent wt., 806, equal to 1.74 N; wt. % chlorine, 0.62.

1,434 g. of about half of the volatile solvent is removed from the main portion of the washed product. This solution containing about 25% volatile solvent (titrimetric equivalent weight=1,051) combined with 240 g. of a mixture of other materials prepared similarly to provide a final product having a titrimetric equivalent weight of 985, the product being polyisobutenyl ethylene diamine (PIB-amine).

EXAMPLE 10

Fullerene Reaction with PIB-amine:

In a round bottom flask 1 g. PIB-amine (Mn=950) prepared as in Example 9 was dissolved in 10 ml heptane. To this solution was added 50 mg of a fullerene mixture extracted from carbon soot, consisting of $C_{60}$ and $C_{70}$ in the ratio of approximately 85 to 15 with less than about 1% higher fullerenes. The solution was stirred for 6 days at room temperature. At the end, the solution was diluted with heptane (20 ml) and filtered. The filtrate was evaporated to get thick red solution. The characteristic IR bands of $C_{60}$ at 527 and 578 cm$^{-1}$ disappear in the reaction product, demonstrating that $C_{60}$ has reacted.

What is claimed is:

1. A polymeric composition comprising the reaction product of a fullerene, and a hydrocarbon containing polymer having at least one reactive amino group selected from the group consisting of primary amino groups, secondary amino groups, and mixtures thereof.

2. The composition of claim 1 wherein the ratio of moles of fullerene to moles of reactive amino groups is greater than 1:1.

3. The composition of claim 1 wherein the ratio of moles of fullerene to moles of reactive amino groups is equal to or less than 1:1.

4. The composition of claim 1 wherein the fullerene is selected from the group consisting of $C_{60}$, $C_{70}$, $C_{76}$, $C_{78}$, $C_{84}$, $C_{120}$ and mixtures thereof.

5. The composition of claim 1 wherein the reaction product is hydrocarbon soluble.

6. The composition of claim 1 wherein the reaction product is crosslinked and insoluble in hydrocarbon solvents.

7. A polymeric composition comprising the reaction product of
a fullerene; and
a reaction product of a long chain hydrocarbyl substituted mono- or dicarboxylic acid or an anhydride of the dicarboxylic acid, said long chain hydrocarbyl having a number average molecular weight of from about 500 to about 10,000, and a polyamine containing at least 2 reactive amino groups selected from the group consisting of primary amino groups, secondary amino groups, and mixtures thereof, wherein the reaction product contains at least one reactive amino group selected from the group consisting of primary and secondary amino groups.

8. The composition of claim 7 wherein the long chain hydrocarbyl is an ethylene alpha-olefin copolymer.

9. The composition of claim 7 wherein the mono-or dicarboxylic acid is selected from the group consisting of maleic acid, fumaric acid, chloromaleic acid, acrylic acid, methylacrylic acid and crotonic acid.

10. A polymeric composition, comprising the reaction product of
a fullerene; and
the reaction product of at least one alkyl substituted hydroxyaromatic compound formed by the alkylation of a hydroxy aromatic compound with an olefin polymer of a $C_2$ to $C_{10}$ monoolefin having a number average molecular weight of from about 500 to about 10,000, an aldehyde reactant and at least one amine having at least two reactive amino groups selected from the group consisting of primary amines, secondary amines and mixtures thereof.

11. The composition of claim 10 wherein the aldehyde reactant is selected from the group consisting of formaldehyde and paraformaldehyde.

12. A polymeric composition, which comprises the reaction product of
a fullerene; and
an amine-containing polymer having at least one reactive amine group selected from the group consisting of primary amines, secondary amines and mixtures thereof, said polymer formed by the process of copolymerizing ethylene with an alpha-olefin and an organometallic compound-masked nitrogen-containing monomer, followed by deashing to remove the organometallic compound.

13. The composition of claim 12 wherein the amine containing polymer is an ethylene alpha-olefin.

14. The composition of claim 12 wherein the amine-containing polymer contains from about 20 wt. % to about 90 wt. % ethylene and from about 80 wt. % to about 10 wt. % propylene by total weight.

15. A polymeric composition comprising the reaction product of
a fullerene; and
an amino-containing polymer formed by reacting an amine compound with a halogenated polymer selected from the group consisting of bromopolyisobutylene and chloropolyisobutylene.

16. A polymeric composition comprising the reaction product of the composition of claim 1 and a compound selected from the group consisting of ammonia, a small molecule amine and an amine-containing polymer having a number average weight of from about 500 to about 500,000, wherein said amine contains at least one primary amine or secondary amino group.

17. A fullerene grafted amine-containing polymer composition having the formula:

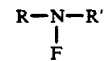

wherein F is a fullerene, and wherein at least one of R and R' is a polymer unit of the polymer R-N-R', and wherein when R or R' is not a polymer unit, the R or R' is selected from the group consisting of H and alkyls.

* * * * *